United States Patent
Hasegawa

(10) Patent No.: US 12,462,611 B2
(45) Date of Patent: Nov. 4, 2025

(54) ACTION DETERMINATION APPARATUS, IMAGE CAPTURING APPARATUS, ACTION DETERMINATION METHOD, AND STORAGE MEDIUM THAT DETECT N TYPES OF BODY PARTS (N>3)

(71) Applicant: CANON KABUSHIKI KAISHA, Tokyo (JP)

(72) Inventor: Reiji Hasegawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 397 days.

(21) Appl. No.: 17/968,896

(22) Filed: Oct. 19, 2022

(65) Prior Publication Data
US 2023/0140436 A1    May 4, 2023

(30) Foreign Application Priority Data
Nov. 4, 2021  (JP) ................ 2021-180510

(51) Int. Cl.
*G06V 40/20* (2022.01)

(52) U.S. Cl.
CPC ................ *G06V 40/23* (2022.01)

(58) Field of Classification Search
CPC .................................... G06V 40/23
See application file for complete search history.

(56) References Cited

U.S. PATENT DOCUMENTS

| | | | |
|---|---|---|---|
| 9,358,456 B1* | 6/2016 | Challinor | A63F 13/44 |
| 9,656,162 B2* | 5/2017 | Polzin | A63F 13/213 |
| 11,298,050 B2 | 4/2022 | Ikeda | |
| 11,721,129 B2* | 8/2023 | Obinata | G06V 40/25 |
| | | | 382/103 |

(Continued)

FOREIGN PATENT DOCUMENTS

| | | |
|---|---|---|
| JP | 2020123239 A | 8/2020 |
| JP | 2020-177557 A | 10/2020 |
| JP | 2021-132267 A | 9/2021 |

OTHER PUBLICATIONS

Alejando Newell et al., "Associative Embedding: End-to-End Learning for Joint Detection and Grouping," Jun. 9, 2017, article (11 pages).

(Continued)

*Primary Examiner* — Bobbak Safaipour
*Assistant Examiner* — Dylan J Sherrillo
(74) *Attorney, Agent, or Firm* — Venable LLP

(57) ABSTRACT

A determination control apparatus that functions as an action determination apparatus including a detection unit performing detection processing for detecting N types of body parts (N≥3), the body parts including a first type, of a subject in an image, and a selection unit configured to select one of a plurality of machine learning models for determining an action of the subject, based on a result of the detection processing. The plurality of learning models includes a first machine learning model to perform inference relating to the action based on a positional relationship of the N types of (Continued)

body parts, including the first type of body part and a second model to perform inference relating to the action based on a positional relationship of M types of body parts (N>M≥2) not including the first type of body part, among the N types of body parts.

9 Claims, 10 Drawing Sheets

(56) References Cited

U.S. PATENT DOCUMENTS

2020/0245904 A1   8/2020   Ikeda
2022/0051061 A1*  2/2022   Chi ........................ G06N 3/045

OTHER PUBLICATIONS

Notice of Reasons for Refusal issued Jul. 7, 2025, in corresponding Japanese Patent Application No. 2021-180510, with English translation (9 pages).

* cited by examiner

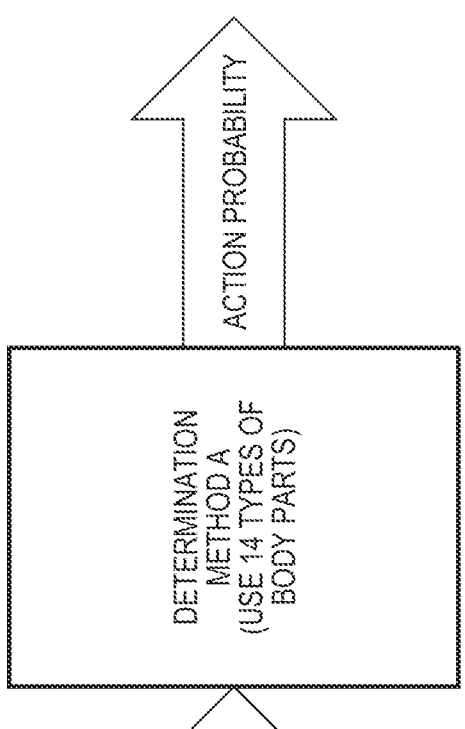
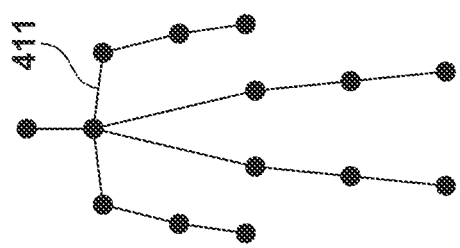
FIG. 4A
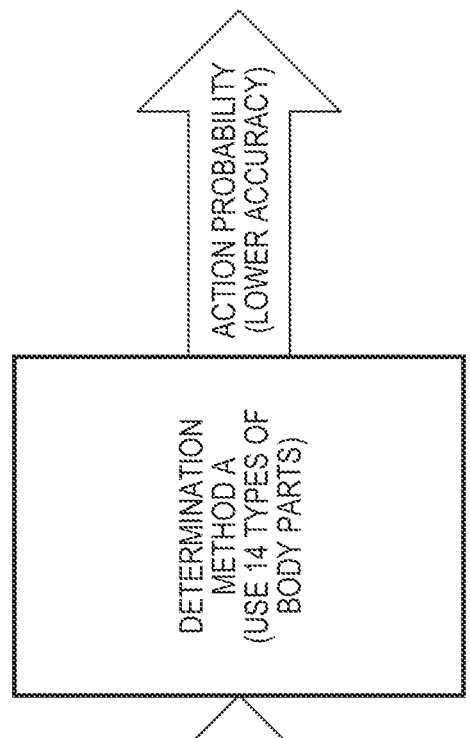
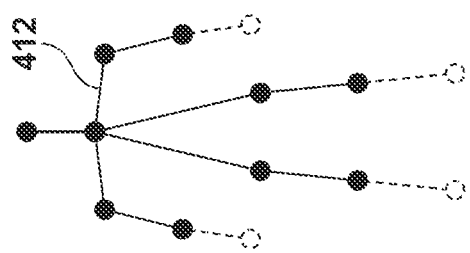
FIG. 4B

ACTION DETERMINATION APPARATUS, IMAGE CAPTURING APPARATUS, ACTION DETERMINATION METHOD, AND STORAGE MEDIUM THAT DETECT N TYPES OF BODY PARTS (N>3)

BACKGROUND OF THE INVENTION

Cross-Reference to Priority Application

This application claims the benefit of Japanese Patent Application No. 2021-180510, filed Nov. 4, 2021, which is hereby incorporated by reference herein in its entirety.

FIELD OF THE INVENTION

The present invention relates to an action determination apparatus, an image capturing apparatus, an action determination method, and a storage medium.

DESCRIPTION OF THE RELATED ART

In fields such as sports analysis and security, there is a desire to detect specific poses and actions of people in images, such as sports images and surveillance camera images. Human pose estimation (hereafter, "pose estimation") is a technology that attempts to estimate the joints of a person in an image and the connections therebetween, and represent the pose of the person with a simple skeletal structure. Specific poses and actions can be detected by performing training and inference with a machine learning model based on pose information of the person.

Pose estimation by a technique known as Associative Embedding (NIPS 2017) enables a plurality of body parts (e.g., head, neck, both shoulders, both elbows, both wrists, both pelves, both knees, both ankles, etc.) of a person in an image to be detected. Training can be performed with a machine learning model based on data such as the coordinates of the detected body parts, the distances between and angles of the body parts, and actions can be determined (inferred).

However, depending on the situation, issues may arise such as some body parts not being detected or the detection reliability of detected body parts being low. For example, in cases such as when people are tightly packed in a sports event, such as basketball or rugby, or when people captured on a surveillance camera are crowded together, there is a possibility, for instance, that ankles cannot be detected due to being hidden or that the detection reliability will be low.

In this case, in order to perform inference using a model trained based on all the body parts targeted for detection, it is necessary to use information such as initial values (or default values) or directly use information having low reliability. As a result, there is a possibility that the inference accuracy will decrease, and the accuracy of action determination will decrease.

Japanese Patent Laid-Open No. 2020-123239 discloses changing the parameters of a pose estimation model using a geometric relationship with the object that is shot. Although a decrease in the accuracy of pose estimation can be suppressed in this case, issues such as not being able to detect body parts and detection reliability being low cannot be dealt with.

SUMMARY OF THE INVENTION

The present invention has been made in view of such situations, and provides a technology that improves the accuracy of action determination that is based on body parts of a subject detected in an image.

According to a first aspect, the present invention, provides an action determination apparatus comprising at least one processor and/or at least one circuit that functions as a detection unit configured to perform detection processing for detecting a plurality of types of body parts of a subject in an image, a selection unit configured to select one of a plurality of determination methods for determining an action of the subject, based on a result of the detection processing, each of the plurality of determination methods using a positional relationship of two or more of the plurality of types of body parts in order to determine the action, and a control unit configured to perform control to determine the action of the subject in accordance with the determination method selected by the selection unit.

According to a second aspect, the present invention, provides an action determination apparatus comprising at least one processor and/or at least one circuit that functions as a detection unit configured to perform detection processing for detecting one or more types of body parts of a subject and a plurality of types of objects in an image, a selection unit configured to select one of a plurality of determination methods for determining an action of the subject, based on a result of the detection processing, each of the plurality of determination methods using a positional relationship of at least one of the one or more types of body parts and at least one of the plurality of types of objects in order to determine the action, and a control unit configured to perform control to determine the action of the subject in accordance with the determination method selected by the selection unit, wherein the selection unit selects a determination method, among the plurality of determination methods, that determines the action of the subject using a type of object detected as a result of the detection processing.

According to a third aspect, the present invention, provides an image capturing apparatus comprising the action determination apparatus according to the first aspect, and an image sensor configured to generate the image.

According to a fourth aspect, the present invention, provides an action determination method executed by an action determination apparatus, comprising performing detection processing for detecting a plurality of types of body parts of a subject in an image, selecting one of a plurality of determination methods for determining an action of the subject, based on a result of the detection processing, each of the plurality of determination methods using a positional relationship of two or more of the plurality of types of body parts in order to determine the action, and performing control to determine the action of the subject in accordance with the determination method selected by the selecting.

According to a fifth aspect, the present invention, provides an action determination method executed by an action determination apparatus, comprising performing detection processing for detecting one or more types of body parts of a subject and a plurality of types of objects in an image, selecting one of a plurality of determination methods for determining an action of the subject, based on a result of the detection processing, each of the plurality of determination methods using a positional relationship of at least one of the one or more types of body parts and at least one of the plurality of types of objects in order to determine the action, and performing control to determine the action of the subject in accordance with the determination method selected by the selecting, wherein the selecting selects a determination method, among the plurality of determination methods, that determines the action of the subject using a type of object detected as a result of the detection processing.

According to a sixth aspect, the present invention, provides a non-transitory computer-readable storage medium that stores a program for causing a computer to execute an action determination method comprising performing detection processing for detecting a plurality of types of body parts of a subject in an image. selecting one of a plurality of determination methods for determining an action of the subject, based on a result of the detection processing, each of the plurality of determination methods using a positional relationship of two or more of the plurality of types of body parts in order to determine the action, and performing control to determine the action of the subject in accordance with the determination method selected by the selecting.

According to a seventh aspect, the present invention, provides a non-transitory computer-readable storage medium that stores a program for causing a computer to execute an action determination method comprising performing detection processing for detecting one or more types of body parts of a subject and a plurality of types of objects in an image, selecting one of a plurality of determination methods for determining an action of the subject, based on a result of the detection processing, each of the plurality of determination methods using a positional relationship of at least one of the one or more types of body parts and at least one of the plurality of types of objects in order to determine the action, and performing control to determine the action of the subject in accordance with the determination method selected by the selecting, wherein the selecting selects a determination method, among the plurality of determination methods, that determines the action of the subject using a type of object detected as a result of the detection processing.

Further features of the present invention will become apparent from the following description of exemplary embodiments with reference to the attached drawings.

BRIEF DESCRIPTION OF THE DRAWINGS

FIGS. 4A to 4C are diagrams illustrating examples of a plurality of determination methods (determination method options) and an example of a criterion for selecting a determination method according to the first embodiment.

DESCRIPTION OF THE EMBODIMENTS

Figure 1:
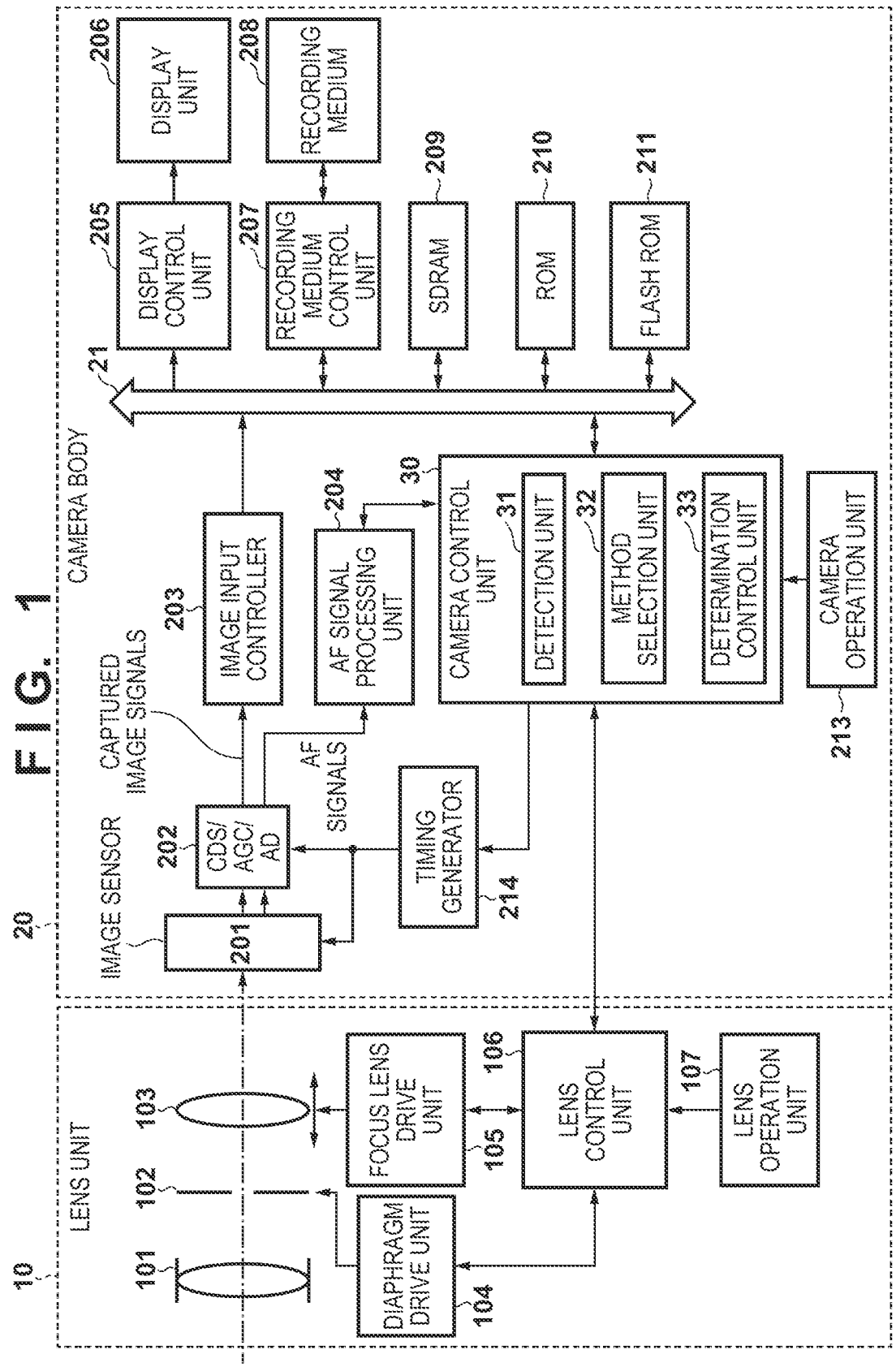
FIG. 1 is a block diagram showing an example functional configuration of an interchangeable lens camera that is an example of an image capturing apparatus according to a first embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an example functional configuration of an interchangeable lens camera that is an example of an image capturing apparatus according to the first embodiment. The image capturing apparatus in FIG. 1 is constituted by an interchangeable lens unit 10 and a camera body 20. The camera body 20 functions as an action determination apparatus for determining the action of a subject. A lens control unit 106 that performs overall control of the operations of the entire lens and a camera control unit 30 that performs overall control of the operations of the entire camera system, including the lens unit 10, are capable of communicating with each other through a terminal (not shown) provided in a lens mount.

First, the configuration of the lens unit 10 will be described. A fixed lens 101, a diaphragm 102, and a focus lens 103 constitute an image capturing optical system. The diaphragm 102 is driven by a diaphragm drive unit 104 and controls the amount of incident light on an image sensor 201 described later. The focus lens 103 is driven by a focus lens drive unit 105. The focusing distance of the image capturing optical system changes, according to the position of the focus lens 103. The diaphragm drive unit 104 and the focus lens drive unit 105 are controlled by the lens control unit 106 and determine the opening amount of the diaphragm 102 and the position of the focus lens 103.

A lens operation unit 107 is an input device group for a user to configure settings relating to the operations of the lens unit 10. Examples of settings include switching of AF (autofocus)/MF (manual focus) mode, positional adjustment of the focus lens 103 by MF, setting of the operating range of the focus lens 103, and setting of image stabilization mode. When the lens operation unit 107 is operated by the user, the lens control unit 106 performs control that depends on the operation.

The lens control unit 106 controls the diaphragm drive unit 104 and the focus lens drive unit 105, according to control commands and control information received from the camera control unit 30, described later. Also, the lens control unit 106 transmits lens control information to the camera control unit 30.

Next, the configuration of the camera body 20 will be described. The camera body 20 is configured to be able to generate captured image signals from a light beam that has passed through the image capturing optical system of the lens unit 10. The image sensor 201 is constituted by a CCD sensor or a CMOS sensor. The incident light beam from the image capturing optical system of the lens unit 10 forms an image on a light receiving surface of the image sensor 201, and is converted into a signal charge that depends on the amount of incident light, by photodiodes provided in pixels arrayed in the image sensor 201. The signal charges accumulated in the photodiodes are sequentially read out from the image sensor 201 as voltage signals (captured image signals or AF signals) that depend on the signal charges.

Readout is performed by a drive pulse that is output by a timing generator 214 in accordance with a command of the camera control unit 30.

A CDS/AGC/AD converter 202 performs correlated double sampling for removing reset noise, gain control, and AD conversion on the captured image signals and AF signals read out of the image sensor 201. The CDS/AGC/AD converter 202 outputs the captured image signals and AF signals obtained by this various processing to an image input controller 203 and an AF signal processing unit 204, respectively.

The image input controller 203 stores the captured image signals output by the CDS/AGC/AD converter 202 as image signals in an SDRAM 209 via a bus 21. The image signals stored in the SDRAM 209 are read out by the display control unit 205 via the bus 21 and displayed on a display unit 206. Also, in a recording mode for recording image signals, the image signals stored in the SDRAM 209 are recorded to a recording medium 208, such as a semiconductor memory, by the recording medium control unit 207.

A ROM 210 stores computer programs (a control program, or a processing program) to be executed by the camera control unit 30, various data necessary for executing the computer programs, and the like. A flash ROM 211 stores various setting information, configured by the user, relating to operations of the camera body 20.

A detection unit 31, in the camera control unit 30, performs detection processing for detecting body parts (joints, head, etc.) of a subject on a captured image signal (image) input from the image input controller 203, and stores a result of the detection processing (detection result) in a work memory (not shown). The detection processing is realizable by any of known technologies such as a neural network, a decision tree or other machine learning model. Hereafter, a case when the subject is a person will be described, but the subject of the present embodiment is not limited to a person, and may be an animal, such as a dog, for example.

A method selection unit 32 selects one of a plurality of determination methods for determining the action of the subject, based on the detection result. The processing of the method selection unit 32 and the determination methods will be described in detail later.

A determination control unit 33 performs control to determine the action of the subject, in accordance with the determination method selected by the method selection unit 32. The action that is the determination target is an action such as a suspicious action that it is hoped to be detected with a surveillance camera and the action of swinging a racket in tennis, for example.

The camera control unit 30 controls the various units of the camera body 20 while exchanging information with the various units. Also, the camera control unit 30 executes various processing corresponding to user operations, such as power ON/OFF, changing various settings, image capture processing, AF processing, and playback processing of recorded images, according to inputs from a camera operation unit 213 that are based on the user operations. Furthermore, the camera control unit 30 executes processing such as transmitting control commands to the lens unit 10 (lens control unit 106) and information of the camera body 20 to the lens control unit 106, and acquiring information of the lens unit 10 from the lens control unit 106. The camera control unit 30 is constituted by a microcomputer and controls the entire camera system including the lens unit 10, by executing a computer program stored in the ROM 210.

Figure 2:
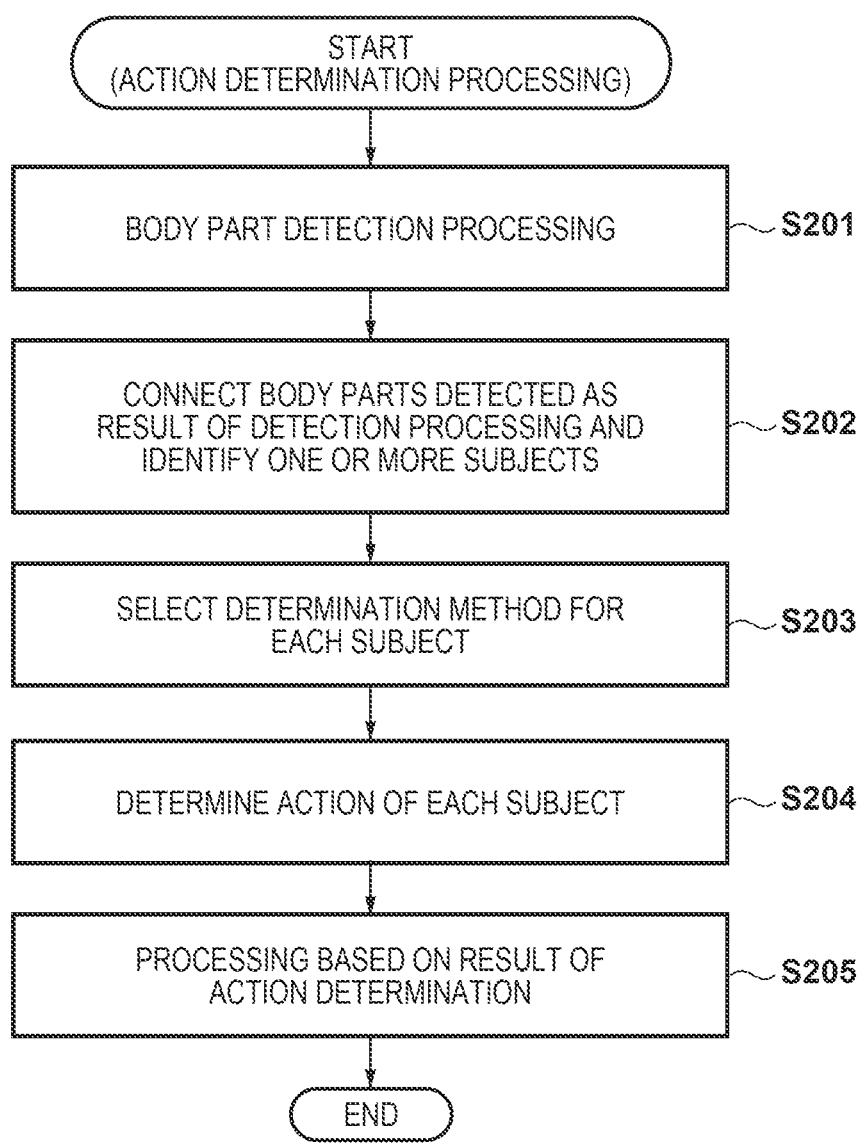
FIG. 2 is a flowchart of processing for determining the action of a subject (action determination processing).

Next, processing that is executed by the camera body 20 will be described, with reference to FIG. 2. FIG. 2 is a flowchart of processing for determining the action of a subject (action determination processing). The processing of the steps of the flowchart is realized by a computer program stored in the ROM 210 being executing by the camera control unit 30, unless otherwise specified. The functions of the detection unit 31, the method selection unit 32, and the determination control unit 33 in the camera control unit 30 are realized by the camera control unit 30 executing the computer program.

In step S201, the detection unit 31 performs detection processing for detecting a plurality of types of body parts of the subject in an image input from the image input controller 203. In the following description, the plurality of types of body parts are fourteen types of body parts, namely, the head, the neck, left and right shoulders, left and right elbows, left and right wrists, left and right hip joints, left and right knees, and left and right ankles, for example.

In step S202, the detection unit 31 connects the body parts detected as a result of the detection processing and identifies one or more subjects.

Figure 3A:
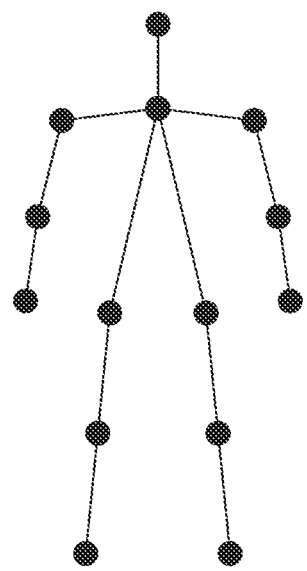
FIGS. 3A to 3I are diagrams illustrating an example of processing for connecting body parts.

Here, an example of the processing for connecting body parts will be described, with reference to FIGS. 3A to 3I. FIG. 3A is a diagram showing an example of the result of connecting fourteen types of body parts described in step S201. In this case, the fourteen types of body parts are connected by thirteen connecting nodes. Hereafter, for the purpose of simplifying the description, the case of connecting six types of body parts, namely, the head, the center of gravity, left and right hands and left and right feet, as shown in FIG. 3B, will be described.

Figure 3B:
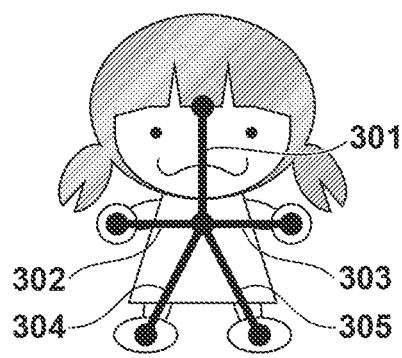
Figure 3C:
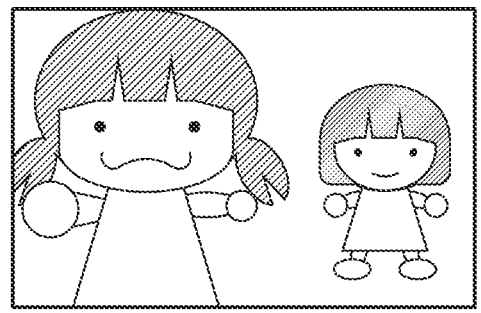
Figure 3D:
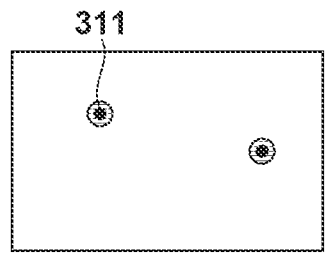
Figure 3E:
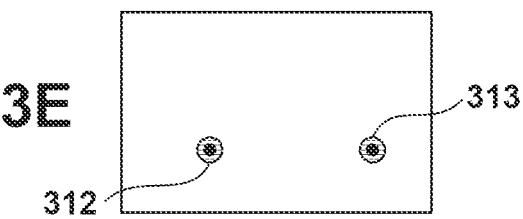
Figure 3F:
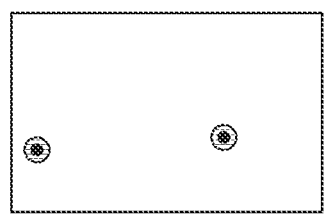
Figure 3G:
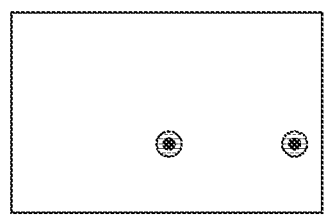
Figure 3H:
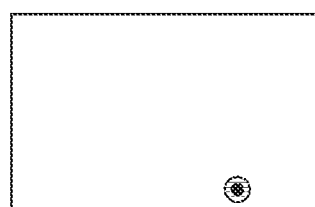
Figure 3I:

Assume, for example, that an image, such as is shown in FIG. 3C, has been input to the detection unit 31. In this case, two heads are detected as shown in FIG. 3D. Similarly, two centers of gravity are detected as shown in FIG. 3E, two right hands are detected as shown in FIG. 3F, two left hands are detected as shown in FIG. 3G, one right foot is detected as shown in FIG. 3H, and one left foot is detected as shown in FIG. 3I.

As the connecting nodes between the body parts, a node 301 between the head and the center of gravity, a node 302 between the right hand and the center of gravity, a node 303 between the left hand and the center of gravity, a node 304 between the right foot and the center of gravity, and a node 305 between the left foot and the center of gravity are necessary, as shown in FIG. 3B. In the case when two heads are detected, as shown in FIG. 3D, there will be two people in the image, and, thus, the detection unit 31 performs the connection processing for each person.

For example, the detection unit 31 selects a head 311 as an initial processing target. When connecting from the head 311 to the center of gravity, there are two candidates for the center of gravity, namely, a center of gravity 312 and a center of gravity 313. The detection unit 31 selects the center of gravity 312 as a connection destination, in accordance with any of known algorithms, such as selecting the candidate closest to the head 311, for example. A connection between the head 311 and the center of gravity 312 is thereby established. By repeating such selection of a connection destination, the detection unit 31 ultimately completes the connection with five nodes, such as is shown in FIG. 3B. Thereafter, the detection unit 31 performs similar processing for the other head. By thus performing connection processing for each subject, the detection unit 31 is able to identify each subject in the image. Here, FIG. 2 will be referred to again. In step S203, the method selection unit 32 selects one of a plurality of determination methods for determining the action of the subject, based on the result of the detection processing by the detection unit 31, and, in step S204, the determination control unit 33 performs control to determine the action of the subject in accordance with the selected determination method. In the case when a plurality of subjects are identified in step S202, the method selection unit 32 selects a determination method for each subject, and the determination control unit 33 performs control to determine the action for each subject.

Each of the plurality of determination methods is configured to use the positional relationship of two or more of a plurality of types of body parts in order to determine the action of the subject. Also, each of the plurality of determination methods is constituted by any of known technologies, such as a neural network, a decision tree or other machine learning model, or a simple rule-based algorithm. Also, different technologies (algorithms) may be used for every determination method. Also, for each of two or more determination methods using the same technology (algorithm), different parameters (e.g., different weights of a neural network) may be used.

Here, examples of a plurality of determination methods (determination method options) and an example of a criterion for selecting a determination method will be described, with reference to FIGS. 4A to 4C.

Figure 4C:
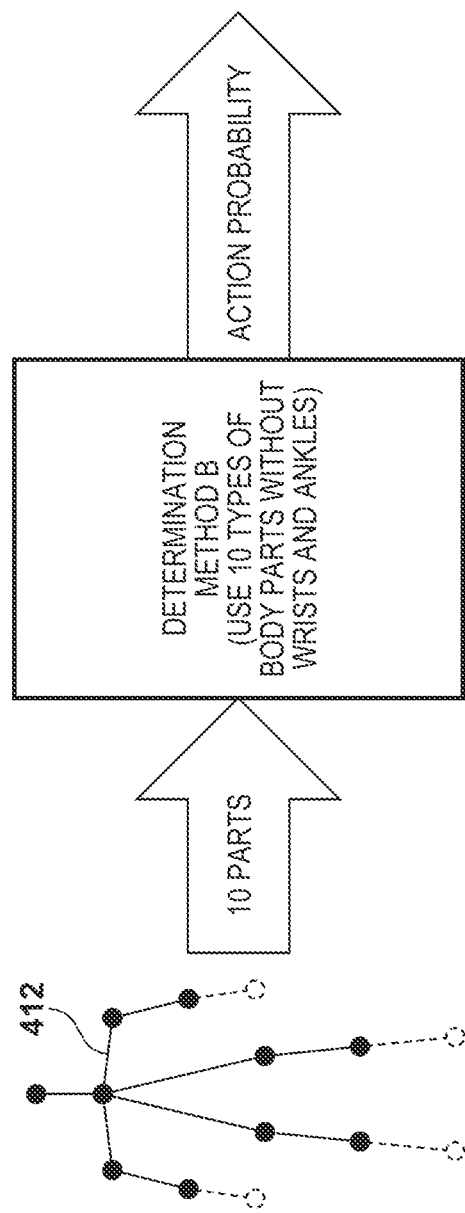

In FIGS. 4A to 4C, determination methods A and B are examples of a plurality of determination methods. The determination method A is a machine learning model configured to perform inference relating to the action of a subject based on the positional relationship of fourteen types of body parts, namely, the head, the neck, left and right shoulders, left and right elbows, left and right wrists, left and right hip joints, left and right knees, and left and right ankles. That is, the determination method A determines the action of the subject, by inferring an action probability based on the positional relationship of these fourteen types of body parts. The determination method B is a machine learning model configured to perform inference relating to the action of a subject based on the positional relationship of ten types of body parts, namely, the head, the neck, left and right shoulders, left and right elbows, left and right hip joints, and left and right knees. That is, the determination method B determines the action of the subject, by inferring an action probability based on the positional relationship of these ten types of body parts.

The action probability referred to here is the probability that the subject is performing the action that is the determination target. For example, in the case when the technology of the present embodiment is applied to a surveillance camera, the determination methods A and B infer the probability that the subject is performing a suspicious action.

As shown in FIG. 4A, all fourteen types of body parts are detected for a subject 411 as a result of the detection processing by the detection unit 31. In this case, the method selection unit 32 selects the determination method A that uses fourteen types of body parts. Because the body parts that are used by the determination method A match the body parts that are actually detected, inference of the action probability is expected to be performed with high accuracy.

On the other hand, as shown in FIGS. 4B and 4C, only ten types of body parts, excluding the left and right wrists and the left and right ankles, are detected for a subject 412 as a result of the detection processing by the detection unit 31. In this case, if the determination method A that uses 14 types of body parts were selected as shown in FIG. 4B, there is a possibility that the inference accuracy of the action probability will decrease. This is because the determination method A requires fourteen types of body parts, and, thus, some sort of parameters, such as initial values (or default values), need to be used as the four types of body parts (left and right wrists and left and right ankles) that were not detected.

In view of this, for the subject 412, the method selection unit 32 selects the determination method B that uses ten types of body parts, as shown in FIG. 4C. Because the body parts that are used by the determination method B match the body parts that are actually detected, inference of the action probability is expected to be performed with higher accuracy than if the determination method A was selected.

In this way, in the case when a specific type (first type) of body part is not detected as a result of the detection processing by the detection unit 31, it becomes possible to suppress a decrease in the accuracy of action determination, by selecting a determination method that determines the action of the subject without using the body part that was not detected. In other words, the accuracy of action determination can be improved, as compared to selecting a determination method configured to use the body part that was not detected.

Note that the plurality of determination methods (determination method options) are not limited to those shown in FIGS. 4A to 4C. For example, the plurality of determination methods may include a determination method X (not shown) that uses twelve types of body parts, excluding the left and right ankles, in addition to the determination methods A and B. In this case, for a subject (not shown) with respect to which twelve types of body parts excluding the left and right ankles are detected, the method selection unit 32 is able to select the determination method X. If the determination methods A and B were the only determination method options, the determination method B would be selected, although, in this case, the detected left and right wrists are ineffectual. By increasing the variation of determination method options, the possibility of being able to select a determination method that effectually uses the body parts that are actually detected can be improved, and the determination accuracy can be improved.

Referring again to FIG. 2, in step S205, the determination control unit 33 performs processing that is based on the result of action determination. For example, the camera control unit 30 is able to select a subject having the highest probability of action that is the determination target (e.g., suspicious action) among a plurality of subjects. As another example, the determination control unit 33 may create a list showing subjects whose probability of action that is the determination target (e.g., suspicious action) is greater than or equal to a threshold value among a plurality of subjects. In the case when the corresponding determination method differs for each subject and the scale biases of the action probabilities are different, the camera control unit 30 is configured to be able to directly compare the action probabilities between the subjects by means such as normalizing the action probabilities.

Next, another example of a criterion for selecting a determination method in step S203 will be described, with reference to FIG. 5. In the example in FIGS. 4A to 4C, the method selection unit 32 selects a determination method based on the body parts that are actually detected as a result of the detection processing, whereas, in the example in FIG. 5, the method selection unit 32 selects a determination method based on the detection reliability of the body parts.

Figure 5:
FIG. 5 is a diagram illustrating another example of a criterion for selecting a determination method according to the first embodiment.

Note that the method selection unit 32 may use the selection criterion of FIG. 5 in combination with the selection criterion of FIG. 4A to 4C.

In FIG. 5, a column 501 shows fourteen types of body parts that are targeted for detection in detection processing by the detection unit 31. A column 502 shows the detection reliability of body parts detected by the detection unit 31. For example, even if the left ankle is detected as a result of the detection processing and the position (coordinates) thereof is identified, that position is not always reliable. The column 502 indicates how reliable data such, as position, is for each body part with a value of zero to one (one being the most reliable). Note that any known technology can be used for the method for determining detection reliability.

A column 503 shows the types of body parts that are used by the determination method A, and a column 504 shows the types of body parts that are used by the determination method B. In the columns 503 and 504, the rows of body parts that are used contain "○". Note that the details of the determination methods A and B are as described above with reference to FIGS. 4A to 4C.

When the action of a subject is determined using body parts having a low detection reliability, there is a possibility that the determination accuracy will decrease. In view of this, the method selection unit 32 selects a determination method such that body parts having a detection reliability lower than a threshold value are not used. This threshold value is determined in advance according to the precision, recall, or the like, required for a product. In the example in FIG. 5, the detection reliability of the right wrist, the left ankle, and the right ankle is lower than the threshold value (0.5 in the example in FIG. 5). In view of this, the method selection unit 32 selects the determination method B that does not use the right wrist, the left ankle, and the right ankle.

In this way, in the case when the detection reliability of a specific type (second type) of body part detected as a result of the detection processing is lower than the threshold value, the method selection unit 32 selects a determination method, among the plurality of determination methods, that determines the action of the subject without using body parts whose detection reliability is lower than the threshold value. It thereby becomes possible to suppress a decrease in the accuracy of action determination. In other words, the accuracy of action determination can be improved, as compared to the case when a determination method configured to use body parts whose detection reliability is lower than the threshold value is selected.

Next, yet another example of a criterion for selecting a determination method in step S203 will be described, with reference to FIGS. 6A and 6B. In the examples in FIGS. 6A and 6B, the method selection unit 32 selects a determination method based on the proximity of a subject (subject of interest) corresponding to the determination method to be selected and another subject (or based on whether another subject is present). Note that the method selection unit 32 may use the selection criterion of FIGS. 6A and 6B in combination with one or both of the selection criterion of FIGS. 4A to 4C and the selection criterion of FIG. 5.

Figure 6A:
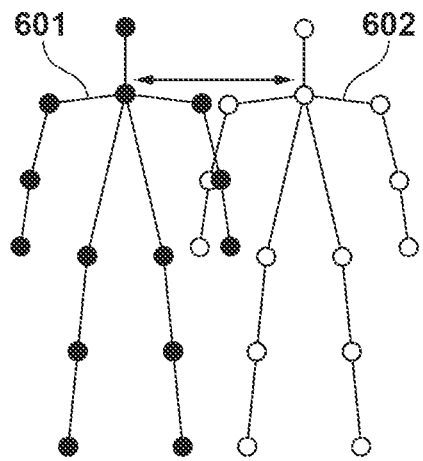
FIGS. 6A to 6B are diagrams illustrating yet another example of a criterion for selecting a determination method according to the first embodiment.
Figure 6B:
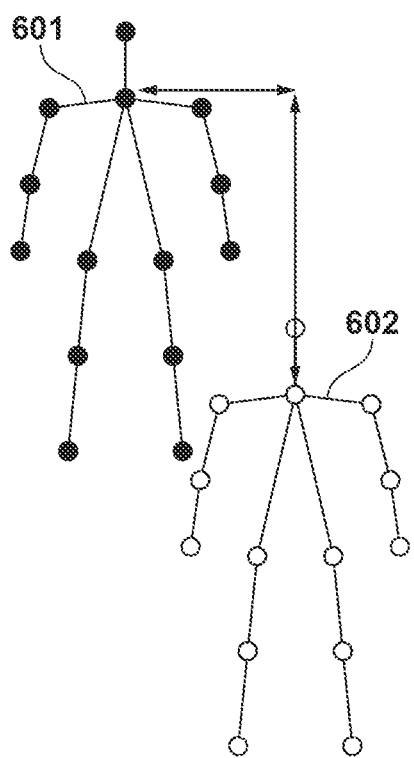

Consider the case when the body parts of subjects 601 and 602 are detected in an image, as shown in FIGS. 6A and 6B. When selecting a determination method for the subject 601, the subject 602 is another subject in relation to the subject 601 (subject of interest).

When the subject 601 (subject of interest) is in close proximity to the subject 602 (another subject), there is a possibility that the detection accuracy of a specific type (third type) of body part, such as the wrists and ankles, may decrease. Also, there is a possibility that the connection accuracy of the specific type (third type) of body part (accuracy of connection processing in step S202 of FIG. 2) will decrease. Thus, if the determination method A that uses the wrists and ankles is selected, there is a possibility that the accuracy of action determination will decrease. In view of this, in the case when the subject of interest is in close proximity to another subject, the method selection unit 32 selects the determination method B that determines the action without using the wrists and ankles for the subject of interest. Note that the details of the determination methods A and B are as described above with reference to FIGS. 4A to 4C.

FIG. 6A shows an example of processing for determining the proximity of the subject 601 and the subject 602. First, the method selection unit 32 calculates an average value of the distance from the neck to the left hip joint and the distance from the neck to the right hip joint as the length of the torso of the subject 601. Next, the method selection unit 32 calculates the distance (inter-neck distance) between the neck of the subject 601 and the neck of the subject 602. If the inter-neck distance is shorter than the length of the torso of the subject 601, there is a possibility that the detection accuracy of the wrists and ankles of the subject 601 has decreased. In view of this, if the inter-neck distance is shorter than the length of the torso of the subject 601, the method selection unit 32 determines that the subject 601 is in close proximity to the subject 602, and selects the determination method B that does not use the wrists and the ankles. Conversely, if the inter-neck distance is greater than or equal to the length of the torso of the subject 601, the method selection unit 32 determines that the subject 601 is not in close proximity to the subject 602, and selects the determination method A that uses the wrists and the ankles.

FIG. 6B shows another example of processing for determining the proximity of the subject 601 and the subject 602. If two subjects are adjacent to each other above and below, there is a possibility that the accuracy of the processing for connecting the body parts that is performed in step S202 will decrease (e.g., there is a possibility that body parts of different subjects will be connected). In view of this, in the example in FIG. 6B, the method selection unit 32 also takes the vertical positional relationship between the subject 601 and the subject 602 into consideration. First, the method selection unit 32 calculates an average value of the distance from the neck to the left hip joint and the distance from the neck to the right hip joint as the length of the torso of the subject 601, similarly to the case of FIG. 6A. Next, the method selection unit 32 calculates the horizontal distance (horizontal inter-neck distance) and the vertical distance (vertical inter-neck distance) between the neck of the subject 601 and the neck of the subject 602. If the horizontal inter-neck distance is shorter than the length of the torso of the subject 601 and the vertical inter-neck distance is shorter than twice the length of the torso of the subject 601, there is a possibility that the detection accuracy or connection accuracy of the wrists and the ankles of the subject 601 has decreased. In view of this, if the horizontal inter-neck distance is shorter than the length of the torso of the subject 601 and the vertical inter-neck distance is shorter than twice the length of the torso of the subject 601, the method selection unit 32 determines that the subject 601 is in close proximity to the subject 602, and selects the determination method B that does not use the wrists and ankles. Conversely, if the horizontal inter-neck distance is greater than or equal to the length of the torso of the subject 601 or the vertical inter-neck distance is greater than or equal to twice the length of the torso of the subject 601, the method selection unit 32 determines that the subject 601 is not in close proximity to the subject 602, and selects the determination method A that uses the wrists and ankles.

In this way, in the case when body parts of another subject other than the subject of interest are further detected as a result of the detection processing, the method selection unit 32 determines whether the subject of interest is in close proximity to the other subject. If the subject of interest is in close proximity to the other subject, the method selection unit 32 selects a determination method, among the plurality of determination methods, that determines the action of the subject of interest without using a specific type (third type) of body part. It thereby becomes possible to suppress a decrease in the accuracy of action determination. In other words, the accuracy of action determination can be improved, as compared to the case when a determination method configured to use the specific type (third type) of body part is selected.

The method for determining whether the subject of interest is in close proximity to another subject is not particularly limited, and, as described above with reference to FIGS. 6A and 6B, for example, a determination method based on the distance between the same type of body part, such as the neck of the subject of interest and the neck of the other subject, can be used.

Note that the method selection unit 32 may select a determination method that determines the action of the subject of interest without using the specific type (third type) of body part, in the case when another subject is present (i.e., in the case when body parts of another subject are detected), regardless of the proximity of the subjects. It thereby becomes possible to suppress a decrease in the accuracy of action determination while at the same time reducing the processing load.

As described above, according to the first embodiment, the camera body 20 performs detection processing for detecting a plurality of types of body parts of a subject in an image, and selects one of a plurality of determination methods for determining the action of the subject, based on the result of the detection processing. Each of the plurality of determination methods uses the positional relationship of two or more of the plurality of types of body parts in order to determine the action. The camera body 20 then performs control to determine the action of the subject in accordance with the selected determination method. Examples of criteria for selecting a determination method based on the result of the detection processing include the examples described with reference to FIGS. 4A to 4C, FIG. 5, and FIGS. 6A and 6B. It thereby becomes possible to improve the accuracy of action determination.

Depending on the combination of body parts, the angle of a specific body part is derived from the positional relationship of that combination of body parts. For example, the angle of the right knee can be derived from the positional relationship of the right hip joint, the right knee and the right ankle. Accordingly, in the above description, determining the action of the subject based on the positional relationship of a plurality of types of body parts also substantively includes determining the action of the subject based on the angle of a specific body part.

Second Embodiment

In a second embodiment, the case when the detection processing by the detection unit 31 (FIG. 2) is configured to detect a predetermined type or a plurality of types of objects in addition to a plurality of types of body parts will be described. In the present embodiment, the basic configuration and operations of the lens unit 10 and the camera body 20 are similar to the first embodiment. Hereafter, the description will focus on the differences from the first embodiment.

Examples of a plurality of determination methods (determination method options) according to the second embodiment and an example of a criterion for selecting a determination method will be described, with reference to FIGS. 7A and 7C.

Figures 7A, 7B:
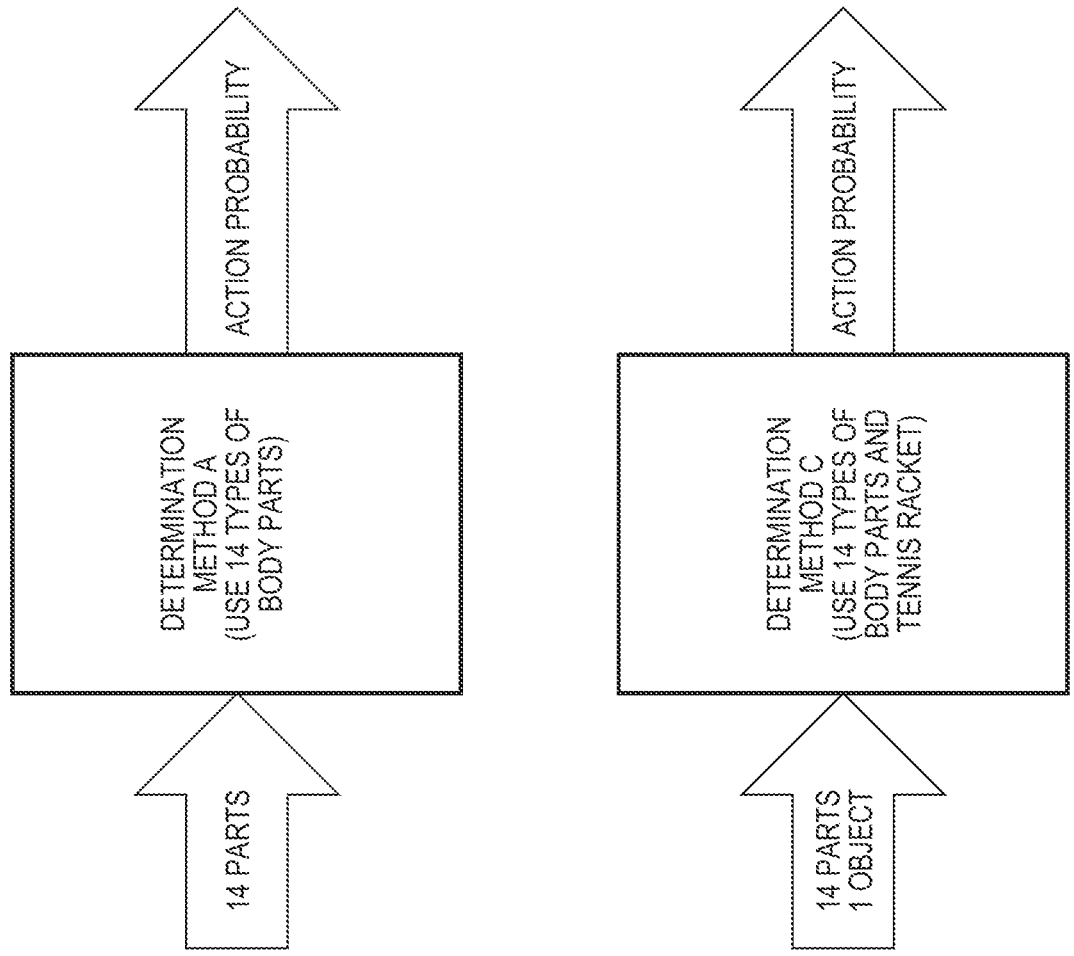
FIGS. 7A to 7C are diagrams illustrating examples of a plurality of determination methods (determination method options) and an example of a criterion for selecting a determination method according to a second embodiment.
Figure 7C:
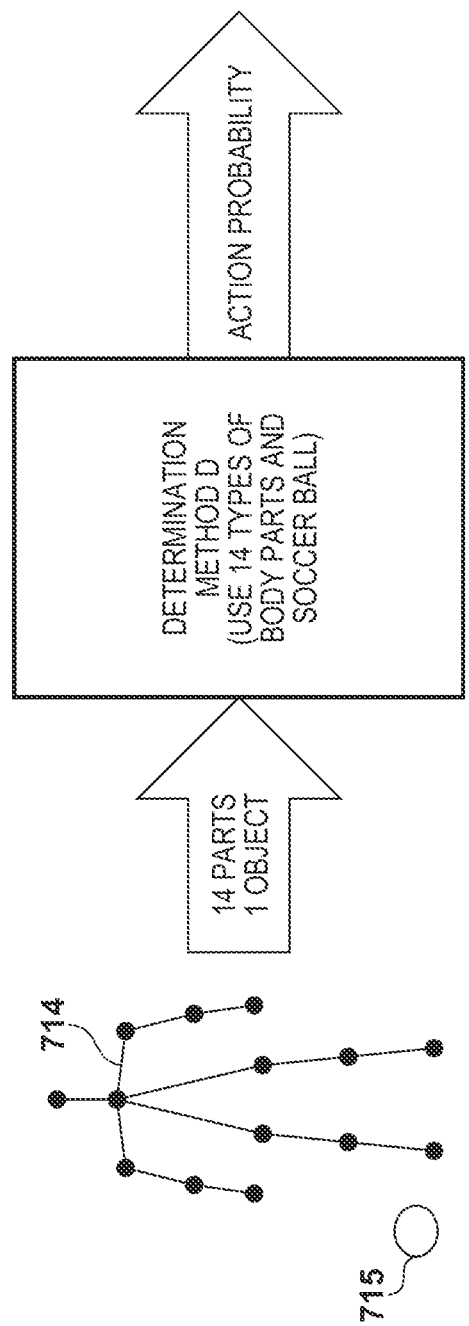

In FIGS. 7A to 7C, the determination methods A, C and D are examples of a plurality of determination methods (determination method options). Details of the determination method A are as described with reference to FIG. 4A to 4C in the first embodiment. The determination method C is a machine learning model configured to perform inference relating to the action of the subject based on the positional relationship of fourteen types of body parts and a tennis racket. That is, the determination method C is configured to determine the action of the subject in a situation when a tennis racket is present (i.e., a situation when there is a high possibility that the sport of tennis is being played). The determination method D is a machine learning model configured to perform inference relating to the action of the subject based on the positional relationship of fourteen types of body parts and a soccer ball. That is, the determination method D is configured to determine the action of the subject in a situation where a soccer ball is present (i.e., a situation where there is a high possibility that the sport of soccer is being played).

As shown in FIG. 7A, fourteen types of body parts have been detected for the subject 711 as a result of the detection processing by the detection unit 31, but an object, such as a tennis racket (predetermined type of object), is not detected. In this case, the method selection unit 32 selects the determination method A that uses the positional relationship of 14 types of body parts.

On the other hand, as shown in FIG. 7B, a tennis racket 713 (predetermined type of object) has been detected for the subject 712 in addition to the fourteen types of body parts, as a result of the detection processing by the detection unit 31. In this case, the method selection unit 32 selects the determination method C that uses the positional relationship of 14 types of body parts and the tennis racket 713.

Also, as shown in FIG. 7C, a soccer ball 715 (predetermined type of object) has been detected for the subject 714 in addition to the fourteen types of body parts, as a result of the detection processing by the detection unit 31. In this case, the method selection unit 32 selects the determination method D that uses the positional relationship of 14 types of body parts and the soccer ball 715.

In the case of detecting the action of a subject in a sport, the contribution rate of a predetermined type of object (soccer ball, etc.) in the determination will increase, depending on the sports event. Thus, when a determination method that uses a predetermined type of object such as the determination method C or D is selected, even though a predetermined type of object is not detected, the determination accuracy will decrease. Thus, if a predetermined type of object is not detected, the method selection unit 32 selects a determination method that does not use a predetermined type of object, such as the determination method A. A decrease in the determination accuracy is thereby suppressed. However, it is not essential for the method selection unit 32 to be capable of selecting a determination method that does not use a predetermined type of object, such as the determination method A.

As described above, according to the second embodiment, the camera body 20 performs detection processing for detecting a predetermined type of object in addition to a plurality of types of body parts, and selects one of a plurality of determination methods for determining the action of the subject, based on the result of the detection processing. The plurality of determination methods include a determination method (determination method C or D, etc.) that uses the positional relationship of two or more of a plurality of types of body parts and a predetermined type of object in order to determine the action. If a predetermined type of object is detected as a result of the detection processing, the camera body 20 selects a determination method that uses the positional relationship between two or more of the plurality of types of body parts and the predetermined type of object in order to determine the action. The camera body 20 then performs control to determine the action of the subject in accordance with the selected determination method.

In this way, in the second embodiment, if a predetermined type of object corresponding to a specific situation (e.g., a situation where tennis is being played) is detected, the camera body 20 selects a determination method that uses the predetermined type of object in addition to body parts. It thereby becomes possible to perform action determination in a form suitable for a specific situation, and the determination accuracy improves.

Note that, in the above description, the determination methods C and D use two or more types of body parts (fourteen types in the example in FIGS. 7A to 7C) and a predetermined type of object. However, the plurality of determination methods (determination method options) may include a determination method that uses one type of body part or a determination method that uses two or more types of objects. In generalized terms, each of the plurality of methods need only be configured to use the positional relationship of at least one body part and at least one type of object in order to determine the action. Also, the detection unit 31 need only be configured to perform detection processing for detecting one or more types of body parts of a subject and a predetermined type of object (or a plurality of types of objects) in an image. By adopting such a configuration, it becomes possible, in the case when the head of a subject and a soccer ball are detected as a result of the detection processing, for example, to determine the action of heading based on the positional relationship between the head and the soccer ball.

Also, instead of detecting a predetermined type of object, the camera body 20 may be configured such that the user is able to select a sports event in advance with a user interface.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A determination control apparatus comprising:
at least one processor and at least one memory storing instructions that, when executed by the at least one processor, causes the determination control apparatus to function as:
an action determination control apparatus including:
  a detection unit configured to perform detection processing for detecting N types of body parts (N≥3), the body parts including a first type of body part, of a subject in an image; and
  a selection unit configured to select one of a plurality of machine learning models for use in determining an action of the subject, based on a result of the detection processing, wherein the plurality of machine learning models includes:
    a first machine learning model configured to perform inference relating to the action based on a positional relationship of the N types of body parts, including the first type of body part; and
    a second machine learning model configured to perform inference relating to the action based on a positional relationship of M types of body parts (N>M≥2) that do not include the first type of body part, among the N types of body parts,
  wherein, if all of the N types of body parts, including the first type of body part, are detected as a result of the detection processing, the selection unit selects the first machine learning model, and,
  if the first type of body part is not detected as a result of the detection processing, the selection unit selects the second machine learning model; and
  a control unit configured to perform action determination control to control the action determination control apparatus based on the one of the plurality of the machine learning models selected by the selection unit.

2. The determination control apparatus according to claim 1, wherein, even in a case when all of the N types of body parts, including the first type of body part, are detected as a result of the detection processing, if a detection reliability of the first type of body part is lower than a threshold value, the selection unit selects the second machine learning model configured to perform inference relating to the action based on a positional relationship of the M types of body parts that do not include the first type of body part.

3. The determination control apparatus according to claim 1, wherein the N types of body parts include a third type of body part,
the plurality of machine learning models includes a third machine learning model configured to perform inference relating to the action based on a positional relationship of L types of body parts (N>L≥2) that do not include the third type of body part, among the N types of body parts, and,
if a body part of another subject, other than the subject, is further detected as a result of the detection processing, the selection unit selects the third machine learning model configured to perform inference relating to the action based on a positional relationship of the L types of body parts that do not include the third type of body part.

4. The determination control apparatus according to claim 3, wherein the action determination control apparatus is further caused to function as a determination unit configured to determine whether the subject is in close proximity to the other subject,
wherein, if it is determined that the subject is in close proximity to the other subject, the selection unit selects the third machine learning model configured to perform inference relating to the action based on a positional relationship of the L types of body parts that do not include the third type of body part.

5. The determination control apparatus according to claim 4, wherein the action determination control unit determines whether the subject is in close proximity to the other subject, based on a distance between a same type of body part of the subject and the other subject.

6. The determination control apparatus according to claim 1, wherein the detection processing is configured to detect a predetermined type of object in addition to the N types of body parts,
the plurality of machine learning models includes a fourth machine learning model configured to perform inference relating to the action based on a positional relationship of one or more of the N types of body parts and the predetermined type of object, and,
if the predetermined type of object is detected as a result of the detection processing, the selection unit selects the fourth machine learning model.

7. An image capturing apparatus comprising:
the determination control apparatus according to claim 1; and
an image sensor configured to generate the image.

8. A determination control method executed by an action determination control apparatus, the method comprising:
performing detection processing for detecting N types of body parts (N≥3), the body parts including a first type of body part of a subject in an image; and
selecting one of a plurality of machine learning models for use in determining an action of the subject, based on a result of the detection processing, wherein the plurality of machine learning models includes:
a first machine learning model configured to perform inference relating to the action based on a positional relationship of the N types of body parts, including the first type of body part; and
a second machine learning model configured to perform inference relating to the action based on a positional relationship of M types of body parts (N>M≥2) that do not include the first type of body part, among the N types of body parts,
wherein, if all of the N types of body parts, including the first type of body part, are detected as a result of the detection processing, the selecting selects the first machine learning model, and,
if the first type of body part is not detected as a result of the detection processing, the selection unit selects the second machine learning model; and
performing control to determine the action of the subject based on the result of the detection processing and the one of the plurality of machine learning models selected by the selection unit.

9. A non-transitory computer-readable storage medium that stores a program for causing a computer to execute a determination control method executed by an action determination control apparatus, the method comprising:
performing detection processing for detecting N types of body parts (N≥3), the body parts including a first type of body part of a subject in an image; and
selecting one of a plurality of machine learning models for use in determining an action of the subject, based on a result of the detection processing, wherein the plurality of machine learning models includes:
a first machine learning model configured to perform inference relating to the action based on a positional relationship of the N types of body parts, including the first type of body part; and
a second machine learning model configured to perform inference relating to the action based on a positional relationship of M types of body parts (N>M≥2) that do not include the first type of body part, among the N types of body parts,
wherein, if all of the N types of body parts, including the first type of body part, are detected as a result of the detection processing, the selecting selects the first machine learning model, and,
if the first type of body part is not detected as a result of the detection processing, the selection unit selects the second machine learning model; and
performing control to determine the action of the subject based on the result of the detection processing and the one of the plurality of machine learning models selected by the selection unit.

* * * * *